US010242045B2

(12) United States Patent
Grue et al.

(10) Patent No.: US 10,242,045 B2
(45) Date of Patent: Mar. 26, 2019

(54) FILTERING CONTENT USING SYNCHRONIZATION DATA

(71) Applicant: Dropbox, Inc., San Francisco, CA (US)

(72) Inventors: Anthony Grue, San Francisco, CA (US); Viraj Mody, Kirkland, WA (US); Chris Varenhorst, San Francisco, CA (US); Sean Lynch, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 400 days.

(21) Appl. No.: 14/067,683

(22) Filed: Oct. 30, 2013

(65) Prior Publication Data

US 2015/0120763 A1    Apr. 30, 2015

(51) Int. Cl.
*G06F 17/30*    (2006.01)
(52) U.S. Cl.
CPC .............. *G06F 17/30386* (2013.01)
(58) Field of Classification Search
CPC .................................................. G06F 17/30867
USPC ........................................ 707/610, 632, 637
See application file for complete search history.

(56) References Cited

U.S. PATENT DOCUMENTS

| | | | | |
|---|---|---|---|---|
| 6,167,433 | A * | 12/2000 | Maples ................. | G06Q 10/10 709/204 |
| 7,032,003 | B1 * | 4/2006 | Shi ....................... | H04W 99/00 707/999.01 |
| 7,991,764 | B2 * | 8/2011 | Rathod ............... | G06F 17/30867 707/640 |
| 8,145,637 | B2 | 3/2012 | Ott, IV et al. | |
| 8,645,358 | B2 * | 2/2014 | Wu ..................... | G06F 17/30867 705/14.54 |
| 9,195,996 | B1 * | 11/2015 | Walsh .................... | H04L 51/32 |
| 9,675,890 | B2 * | 6/2017 | Ahiska ..................... | A63F 13/77 |
| 9,792,298 | B1 * | 10/2017 | Taylor ............... | G06F 17/30215 |
| 2002/0013831 | A1 * | 1/2002 | Astala ..................... | H04L 63/08 709/220 |
| 2002/0141342 | A1 * | 10/2002 | Furman ............... | H04L 41/0213 370/235 |
| 2003/0145020 | A1 * | 7/2003 | Ngo ................... | G06F 17/30174 |
| 2005/0210155 | A1 * | 9/2005 | Oeda ....................... | H04L 67/16 709/249 |
| 2006/0004716 | A1 * | 1/2006 | Hurst-Hiller ....... | G06F 17/30867 |
| 2006/0095443 | A1 * | 5/2006 | Kumar ................ | G06F 17/3089 |
| 2006/0147009 | A1 * | 7/2006 | Greenlee ........... | H04L 29/06027 379/202.01 |
| 2006/0147099 | A1 * | 7/2006 | Marshall ................ | G06Q 50/24 382/128 |
| 2007/0203954 | A1 * | 8/2007 | Vargas .............. | G06F 17/30584 |
| 2007/0271309 | A1 * | 11/2007 | Witriol .............. | G06F 17/30575 |
| 2010/0312782 | A1 | 12/2010 | Li et al. | |
| 2010/0317381 | A1 * | 12/2010 | van Meurs .......... | H04L 12/1859 455/466 |

(Continued)

*Primary Examiner* — Baoquoc N To
(74) *Attorney, Agent, or Firm* — Polsinelli PC (57) ABSTRACT

The disclosed embodiments provide a system that facilitates access to content. During operation, the system provides access to a set of content items associated with at least one user account in a synchronized content management system through a file chooser on an electronic device. Next, the system provides one or more filters for viewing the content items through the file chooser, wherein the one or more filters are based at least in part on synchronization data associated with the set of content items.

20 Claims, 6 Drawing Sheets

(56) References Cited

U.S. PATENT DOCUMENTS

| | | | |
|---|---|---|---|
| 2012/0290916 A1* | 11/2012 | Parekh | G06F 17/30058 715/234 |
| 2013/0110537 A1* | 5/2013 | Smith | G06Q 10/06 705/2 |
| 2013/0203442 A1* | 8/2013 | LeBlanc | G06Q 10/109 455/456.3 |
| 2013/0212067 A1* | 8/2013 | Piasecki | G06F 17/30176 707/620 |
| 2013/0232121 A1* | 9/2013 | Tucker | G06F 17/30283 707/655 |
| 2013/0282657 A1* | 10/2013 | Besen | G06F 17/30215 707/625 |
| 2013/0282785 A1* | 10/2013 | Besen | G06F 17/30174 709/201 |
| 2014/0030980 A1* | 1/2014 | D'Ambrosio | H04W 76/02 455/41.3 |
| 2014/0074712 A1* | 3/2014 | Palmer | G06Q 20/1235 705/44 |
| 2014/0279893 A1* | 9/2014 | Branton | G06F 17/30994 707/634 |
| 2014/0279896 A1* | 9/2014 | Branton | G06F 17/30581 707/634 |
| 2014/0281875 A1* | 9/2014 | Branton | G06F 17/241 715/230 |
| 2016/0162637 A1* | 6/2016 | Smith | G06Q 10/06 705/3 |

\* cited by examiner

FILTERING CONTENT USING SYNCHRONIZATION DATA

BACKGROUND

Field

The disclosed embodiments relate to techniques for managing access to content. More specifically, the disclosed embodiments relate to techniques for using synchronization data to filter content at synchronized content management systems.

Related Art

Content on electronic devices is commonly synchronized, stored, shared, and/or backed up on synchronized content management systems such as file hosting services, cloud storage services, and/or remote backup services. For example, images, audio, video, documents, executables, and/or other types of content may be stored on a network-enabled electronic device such as a personal computer, laptop computer, portable media player, tablet computer, and/or mobile phone. A user of the electronic device may also have a user account with a cloud storage service that allows copies of the content to be stored and/or backed up with the cloud storage service. The cloud storage service may further transmit the copies to other electronic devices of the user and/or other users who are authorized to access the files, thus synchronizing the content between the cloud storage service and electronic devices.

However, the widespread creation, transmission, sharing, and/or use of content through a synchronized content management system may interfere with a user's ability to easily locate and/or access the content at the synchronized content management system. For example, a user may store and/or share various types and/or versions of content within a organizational structure at the synchronized content management system. The user may also create new directories and/or sub-directories to organize the content. As the amount of content and/or the organizational structure grows, the user may have difficulty locating and/or remembering content uploaded to the synchronized content management system.

Consequently, use of synchronized content management systems may be facilitated by mechanisms for easily accessing and/or locating content on the synchronized content management systems.

SUMMARY

The disclosed embodiments provide a system that facilitates access to content. During operation, the system provides access to a set of content items associated with at least one user account in a synchronized content management system through a file chooser on an electronic device. Next, the system provides one or more filters for viewing the content items through the file chooser, wherein the one or more filters are based at least in part on synchronization data associated with the set of content items. As a result, the system may facilitate efficient access to "relevant" content items by a user of the electronic device.

In some embodiments, the synchronization data includes a creation time, an access time, a modification time, a source, a share status, one or more authorized users, one or more applications, a last modifying user, a number of modifications, a number of sharing users, or a share type.

In some embodiments, providing the one or more filters for viewing the content items through the file chooser involves:
(i) generating a first ordered listing using a first filter;
(ii) generating a second ordered listing using a second filter; and
(iii) presenting the first and second ordered listings in the file chooser.

In some embodiments, use of the content items is associated with at least one of:
(i) access to the content items;
(ii) modification to the content items;
(iii) creation of the content items; and
(iv) uploading of the content items to the synchronized content management system.

In some embodiments, the file chooser comprises a filter presentation mechanism for obtaining a user selection of the one or more filters.

In some embodiments, the one or more filters are based on a user preference. For example, the user may configure the application of the filters to the content items within the file chooser and/or the display of various filters within the filter presentation mechanism.

In some embodiments, the ordered listing includes a proper subset of the set of content items.

In some embodiments, providing the one or more filters for viewing the content items through the file chooser involves at least one of:
(i) enabling application of the one or more filters to the set of content items;
(ii) displaying one or more filtered content items within the file chooser;
(iii) displaying a organizational structure for the content items below the one or more filtered content items; and
(iv) providing a link to the organizational structure within the file chooser.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The disclosed embodiments provide a method and system for facilitating access to content. The content may include executables, documents, images, audio, video, and/or other files that may be accessed and/or viewed from electronic devices such as personal computers, laptop computers, tablet computers, mobile phones, personal digital assistants, portable media players, and/or digital media receivers. The content may also be synchronized between the electronic devices and a synchronized content management system that provides a file hosting service, cloud storage service, and/or remote backup service to users of the electronic devices. For example, the synchronized content management system may allow users of the electronic devices to store, share, and/or back up content from the electronic devices.

More specifically, the disclosed embodiments provide a method and system for filtering the content within a file chooser. The file chooser may be accessed through an application on each electronic device and/or an application programming interface (API) with the application. In addition, the file chooser may enable access to a set of content items such as files, directories and/or other containers, and/or other data items at the synchronized content management system. Within the file chooser, the content items may be filtered based on synchronization data associated with one or more users of the synchronized content management system. The synchronization data may include a creation time, an access time, a modification time, a source, a share status, one or more authorized users, one or more applications, a last modifying user, a number of modifications, a number of sharing users, and/or a share type.

To perform such filtering, the file chooser may enable application of the one or more filters to the set of content items, display one or more filtered content items within the file chooser, display an organizational structure for the content items below the one or more filtered content items, and/or provide a link to the organizational structure within the file chooser. As a result, the file chooser may allow the users to identify and/or locate content items more easily and/or efficiently than a conventional file-selection mechanism that requires the users to navigate through the organizational structure to access the content items.

Figure 1:
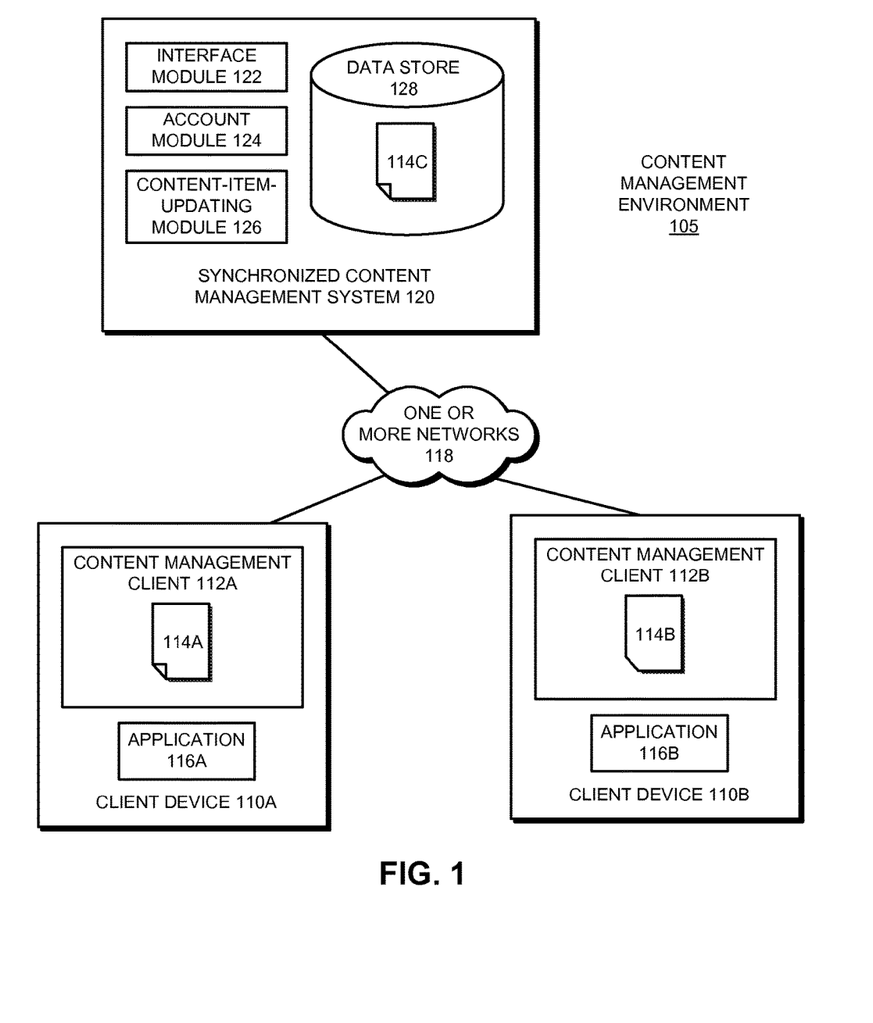
FIG. 1 shows a schematic of a system in accordance with the disclosed embodiments.

FIG. 1 shows a schematic of a system in accordance with the disclosed embodiments. As shown in FIG. 1, the system corresponds to a content management environment 105, which includes a set of client devices 110A and 110B (collectively 110) and a synchronized content management system 120 interconnected by one or more networks 118. Networks 118 may include a local area network (LAN), wide area network (WAN), personal area network (PAN), virtual private network, intranet, cellular network, WiFi network, Bluetooth (Bluetooth™ is a registered trademark of Bluetooth SIG, Inc.) network, universal serial bus (USB) network, and/or Ethernet network. Various aspects of client devices 110 and synchronized content management system 120 are discussed below.

Each client device 110 may selectively execute a content management client application 112A and 112B (collectively 112) (also referred to as a "content management client") that may be used to access content items stored within synchronized content management system 120. While only two client devices 110A and 110B are shown in FIG. 1 for purposes of clarity, those skilled in the art will appreciate that many client devices 110 may simultaneously connect through network(s) 118 to synchronized content management system 120 at any given time. Examples of suitable client devices 110 include, but are not limited to, personal computers; mobile computing devices, such as laptop computers and/or tablet computers; handheld devices, such as a smartphone (e.g., an IPHONE®, BLACKBERRY®, or ANDROID™-based smartphone), personal digital assistant, and/or portable media player; digital media receivers; and/or other network-enabled electronic devices.

In one or more embodiments, content management client application 112 supports automatic synchronization between client devices 110 and synchronized content management system 120. For example, content management client application 112 may automatically synchronize changes associated with a designated directory (e.g., new, deleted, modified, copied, and/or moved files and/or subdirectories within the directory) between each client device 110 and synchronized content management system 120. To perform such synchronization, content management client applications 112 may monitor a local directory corresponding to the designated directory on client devices 110 and synchronize changes to the local directory with a remote directory corresponding to the designated directory on synchronized content management system 120. Conversely, content management client application 112 may identify changes to the remote directory and propagate the changes to the local directory.

Synchronized copies of a content item 114A, 114B and 114C may thus be maintained on client devices 110A and 110B and within synchronized content management system 120, respectively. Alternatively, client devices 110 may provide a file-browser type interface (not shown) for directly manipulating the content items stored on synchronized content management system 120 without maintaining a local copy. Client devices 110 may also include applications 116A and 116B (collectively 116) that manipulate copies of content items 114A and 114B. For example, applications 116 may be used to create, modify, process, and/or otherwise use documents, images, video, audio, and/or other content items (e.g., content items 114) on client devices 110.

Each client device 110 may store a local, synchronized copy of a content item from synchronized content management system 120 in any suitable format. When content management client 112 presents content items that are stored within synchronized content management system 120 to a user, the content items may be arranged in directories, which may be arranged in other directories, or in any other arbitrary arrangement and/or organizational structure supported by synchronized content management system 120 and/or determined by the user. Consequently, each user's content item storage architecture may be considerably different from the next, and in some instances, the content item storage architecture may be implemented to maximize storage and content item retrieval efficiency.

Synchronized content management system 120 stores content items and manages access to those content items via client devices 110. Synchronized content management system 120 and its components may be implemented using any appropriate hardware and software that supports file serving, storage, and retrieval functions. For example, synchronized content management system 120 may be implemented using one or more servers, cloud storage, network-attached storage (NAS), a storage area network (SAN), a redundant array of inexpensive disks (RAID) system, and/or other network-accessible storage. Synchronized content management system 120 may additionally store the content items using a variety of filesystem architectures and/or hierarchies and obscure the locations and/or mechanisms involved in storing the data from client devices 110.

As shown in FIG. 1, synchronized content management system 120 includes an interface module 122, an account module 124, a content-item-updating module 126, and a data store 128. The components of synchronized content management system 120 are discussed below.

Interface module 122 may facilitate content item access and content item storage operations among synchronized content management system 120 and client devices 110. Interface module 122 may receive content items from and send content items to client devices 110 consistent with each user's preferences for sharing content items. Interface module 122 may also act as the counterpart to a client-side file-explorer style user interface that allows a user to manipulate content items directly stored on synchronized content management system 120.

In one or more embodiments, software on client devices 110 may integrate network-stored content items with the client's local filesystem to enable the user to manipulate network-stored content items through the same user interface (UI) used to manipulate content items on the local filesystem, such as through a file explorer, file finder, file chooser, and/or browser application. As an alternative or supplement to the client-side file-explorer interface, interface module 122 may provide a web interface for client devices 110 to access (e.g., via applications 116) and allow the user to manipulate content items stored within synchronized content management system 120. In this way, the user can directly manipulate content items stored within synchronized content management system 120.

Data store 128 may store content items such as those uploaded using client devices 110 and/or other suitable electronic devices. In the embodiment illustrated in FIG. 1, client device 110A, which is associated with a first user, is shown as locally storing at least one content item 114A, and client device 110B, which is associated with a second user, is shown as locally storing at least one content item 114B. A copy of the locally stored content item 114C may also be maintained in data store 128 of synchronized content management system 120. Consequently, content items 114A, 114B and 114C may be local versions of the same shared document that reside on client device 110A, client device 110B, and synchronized content management system 120, respectively. Note that client devices 110A and 110B may also store other content items that are replicated on synchronized content management system 120, but are not shared with other client devices.

Data store 128 may maintain information identifying the user, information describing the user's file directory, and/or other information in a file journal that is maintained for each user. The file journal may be maintained on synchronized content management system 120 and/or as a "server-side file journal" on both synchronized content management system 120 and locally on each client device 110. The file journal may be used to synchronize various copies of a particular content item that are associated with a user's account.

As a particular example, in the embodiment shown in FIG. 1, the system may be configured so that any changes that are made to content item 114A on particular client device 110A may also be automatically reflected in the copy of content item 114C stored within synchronized content management system 120 and the copy of the content item 114B on client device 110B. Similarly, any changes that are made to content item 114C on synchronized content management system 120 may also be automatically reflected in the copy of content item 114A stored on client device 110A, and the copy of content item 114B stored on client device 110B.

Moreover, content items 114A and 114B may be stored in local caches within content management clients 112A and 112B, respectively. Alternatively, content items 114A and 114B may be stored in local filesystems within content management clients 112A and 112B. In some situations, content items 114A and 114B are stored in filesystem space that is reserved for content management clients 112A and 112B. In other situations, content items 114A and 114B are stored in normal filesystem space that is not reserved for content management clients 112A and 112B.

Account module 124 may track content items stored in data store 128 and entries in the server-side file journal for each content item. As users grant content-item-access permissions to other users, account module 124 may update the server-side file journal associated with each relevant user in data store 128. Account module 124 may also track client devices 110 that are associated with each user's account. For example, a user may want to share all content items among his/her desktop computer, tablet computer, and mobile device. To make such a sharing arrangement seamless to the user, the user's single account on synchronized content management system 120 may be associated with each of the user's respective client devices. An application running on each respective client device 110 may help to coordinate synchronization of content items on the client device with corresponding versions of the content items within the user's account in synchronized content management system 120 and/or on the user's various other client devices.

Content-item-updating module 126 may maintain consistency among different copies (versions) of a content item 114A, 114B and 114C that are located in client device 110A, client device 110B and synchronized content management system 120, respectively. This can be complicated, because the different versions 114A, 114B and 114C of the same shared content item may be simultaneously changed at client devices 110A-B and synchronized content management system 120. Hence, synchronized content management system 120 may enforce an updating policy to resolve conflicting updates to different versions of the same content item. For example, the copy of content item 114C on synchronized content management system 120 may be designated as the master copy, and updates to copies 114A and 114B of the content item may be serialized and applied one-at-a-time to the master copy 114C before being propagated back to copies 114A and 114B located on client devices 110A and 110B.

In one or more embodiments, content management environment 105 includes functionality to facilitate access to content items associated with synchronized content management system 120 from client devices 110. As mentioned above, each client device 110 may provide a file chooser and/or client-side file explorer for identifying, manipulating, selecting, and/or accessing content items associated with synchronized content management system 120. To increase the relevance of content items shown to the users within the file chooser, the file chooser may provide one or more filters for the content items. As discussed in further detail below, the filter(s) may be based on synchronization data associated with the content items, such as a creation time, an access time, a modification time, a source, a share status, one or more authorized users, one or more applications, a last modifying user, a number of modifications, a number of sharing users, and/or a share type of each content item.

Figure 2:
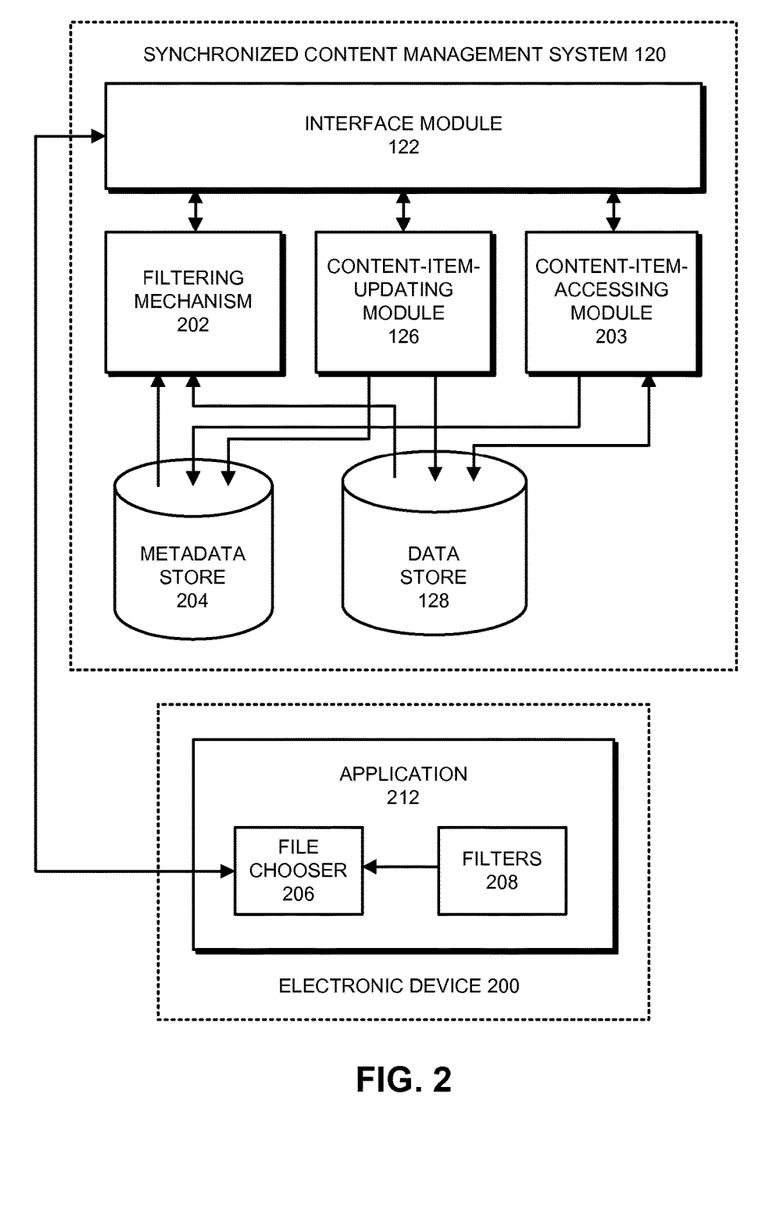
FIG. 2 shows a system for facilitating access to content in accordance with the disclosed embodiments.

FIG. 2 shows a system for facilitating access to content in accordance with the disclosed embodiments. As mentioned above, users typically interact with synchronized content management system 120 through an application 212 on an electronic device 200, such as content management client applications 112 and/or applications 116 executing on client devices 110 of FIG. 1. To facilitate these user interactions, application 212 may include a file chooser 206 that provides a user interface to a user of electronic device 200 and communicates with an interface module 122 of synchronized content management system 120.

A user of electronic device 200 may use file chooser 206 to access content items at synchronized content management system 120. In addition, file chooser 206 may be accessed through application 212 and/or an API with application 212. For example, application 212 may be an email client, instant-messaging application, photo-sharing application, and/or other application that utilizes the features and/or functionality of synchronized content management system 120 to perform tasks for the user. To enable use of file chooser 206 by the user, application 212 may make one or more calls to an API associated with synchronized content management system 120 during use of application 212 by the user. The API call(s) may enable the presentation of file chooser 206 to the user, selection of one or more content items by the user within file chooser 206, and/or execution of one or more tasks associated with the selected content item(s) through file chooser 206 and/or synchronized content management system 120.

Prior to launching file chooser 206, application 212 may verify that the user is logged into synchronized content management system 120. If the user is not logged into synchronized content management system 120, application 212 may provide a dialog box and/or one or more other user-interface elements that allow the user to provide authentication credentials (e.g., username and password) for a user account and/or create a user account with synchronized content management system 120. Once the user is authenticated with synchronized content management system 120, application 212 may enable access to the user's content items with synchronized content management system 120 through file chooser 206. For example, application 212 may allow the user to navigate a hierarchical organizational structure containing directories, sub-directories, files, file types, and/or other content items associated with the user account through file chooser 206.

In one or more embodiments, the system of FIG. 2 includes functionality to facilitate the user's identification, location, and/or use of content items at synchronized content management system 120. As shown in FIG. 2, file chooser 206 may be associated with a set of filters 208 for viewing content items accessible to the user through file chooser 206. Filters 208 may be applied to content items displayed within file chooser 206 to facilitate access to relevant content items by the user. In addition, a filtering mechanism 202 associated with file chooser 206 and/or synchronized content management system 120 may apply filters 208 based on characteristics of the content items as obtained from data store 128 and/or a metadata store 204 containing synchronization data for the content items. For example, application 212 may specify a filter from filters 208 to interface module 122, and interface module 122 may return content items with data and/or synchronization data that match the filter to application 212 for display within file chooser 206. Synchronization data for content items is described in further detail below with respect to FIG. 3.

In addition, synchronization data for content items may be updated by both content-item-updating module 126 and content-item-accessing module 203. As discussed above, content-item-updating module 126 may coordinate updates to different copies of a content item located in different electronic devices (e.g., client devices 110A-110B of FIG. 1) and data store 128 of synchronized content management system 120. When content-item-updating module 126 updates a specific content item, content-item-updating module 126 also updates information for the specific content item within metadata store 204 to reflect the update. For example, if a content item is updated by a new user who has never updated the content item before, content-item-updating module 126 may update the content item's time of update, last modifying user, and/or number of updates within metadata store 204.

Content-item-accessing module 203 may coordinate accesses, such as read accesses that are directed to a content item in synchronized content management system 120. When content-item-accessing module 203 accesses a specific content item, content-item-accessing module 203 also updates information within metadata store 204 to reflect the access. For example, if a content item is accessed by a user who has accessed the content item before, but the user is accessing the content item from a different electronic device, content-item-accessing module 203 may update the content item's time of access and/or number of accesses within metadata store 204.

In one or more embodiments, filters 208 are based on synchronization data associated with the content items. For example, filters 208 may include filters for content items that have been accessed, modified, created, and/or uploaded to synchronized content management system 120 within a pre-specified period (e.g., one day, one week, one month, etc.) from the present. The filters may also identify content items that are frequently accessed and/or updated by the user and/or other users.

Filters 208 may also be based on access to content items on synchronized content management system 120 by application 212. As mentioned above, the user may have a user account with synchronized content management system 120 and a set of content items accessible to the user through synchronized content management system 120. Application 212 may use the user account and/or associated content items to perform one or more tasks for the user. For example, application 212 may include the user's content items with synchronized content management system 120 as attachments to emails, instant message, and/or text messages. Alternatively, application 212 may be used to aggregate and/or show specific types of content items, such as images, documents, video, audio, and/or content items that match specific file formats. Consequently, access to the user's content items by application 212 may be limited to specific content items and/or types of content items, which may be identified using one or more filters 208.

Filters 208 may further be based on one or more sources of the content items, such as electronic device 200 and/or other electronic devices through which the content items are created, uploaded, modified, and/or accessed. For example, filters 208 may include filters for content items that have been created, uploaded, and/or modified using the user's electronic devices, specific types of electronic device (e.g., laptop computer, tablet computer, mobile phone, etc.), and/or specific models of electronic device.

Finally, filters 208 may be based on attributes associated with sharing of the content items. For example, filters 208 may include filters for one or more authorized users of a content item, the number of users among which the content item is shared, the share status (e.g., shared, unshared, etc.) of the content item, and/or the share type (e.g., read-write, read-only) of the content item.

To provide filters 208, application 212 and/or file chooser 206 may enable application of filters 208 to the set of content items. For example, application 212 and/or file chooser 206 may include a filter presentation mechanism that displays a set of icons, buttons, links, and/or other user-interface elements that the user may select to apply the corresponding filters to the content items. Next, application 212 and/or file chooser 206 may display one or more filtered content items within file chooser 206. For example, application 212 may display a proper subset of the content items that match a selected filter as an ordered listing, a set of icons, one or more columns, and/or one or more other views within file chooser 206 and enable selection of one or more of the displayed content items by the user. If multiple filters are selected and/or used, application 212 and/or file chooser 206 may generate and present multiple ordered listings associated with individual filters and/or groups of filters to the user.

Application 212 may also enable access to a organizational structure for all content items associated with the user from file chooser 206. For example, application 212 may provide content items that match a selected filter in a "filtered content" section at the top of file chooser 206 and the organizational structure containing directories, subdirectories, content item types, and/or content items associated with the user in an "all content" section below the "filtered content" section. Alternatively, application 212 may provide a button, icon, link, and/or other user-interface element that the user may select to navigate to the organizational structure within the file chooser.

Such filtering of content items within file chooser 206 may allow the user to easily and/or efficiently find content items that are relevant to the user's use of application 212 and/or electronic device 200. For example, the system of FIG. 2 may facilitate the user's identification and/or selection of recently used content items, shared content items, and/or content items associated with application 212 and/or electronic device 200. In turn, the system of FIG. 2 may streamline use of both application 212 and synchronized content management system 120 for the user. For example, file chooser 206, filtering mechanism 202, and/or filters 208 may allow the user to quickly select files for inclusion in emails, messages, photo albums, archives, and/or other mechanisms for aggregating, processing, and/or transmitting content items.

Those skilled in the art will appreciate that the system of FIG. 2 may be implemented in a variety of ways. As mentioned above, synchronized content management system 120 may utilize a number of storage mechanisms and/or filesystem architectures to provide data store 128 and/or metadata store 204. Moreover, synchronization data for the content items may be stored with the content items in data store 128 instead of in a separate metadata store 204. For example, if content items are stored in relational-database records within data store 128, synchronization data for the content items can be stored in additional fields in the records that contain the content items.

Similarly, filtering mechanism 202 may execute on synchronized content management system 120 and/or electronic device 200. For example, filtering mechanism 202 may reside on synchronized content management system 120 and process API calls from application 212 by returning content items that match filters specified in the API calls to application 212. Conversely, filtering mechanism 202 may execute on electronic device 200 and filter a set of content items obtained from interface module 122 before the content items are displayed to the user within file chooser 206.

Finally, file chooser 206 may be implemented using a number of mechanisms on electronic device 200. For example, file chooser 206 may be provided by a natively installed executable and/or library on electronic device 200 that is called by application 212 through an API. Alternatively, application 212 may gain access to file chooser 206 by registering with a service associated with file chooser 206. To interact with file chooser 206, the user may use keyboard shortcuts, cursor input, gestures, and/or other types of input supported by the platform of electronic device 200 and/or file chooser 206. If a native version of file chooser 206 is not available, file chooser 206 may be shown within a web browser on electronic device 200.

Figure 3:
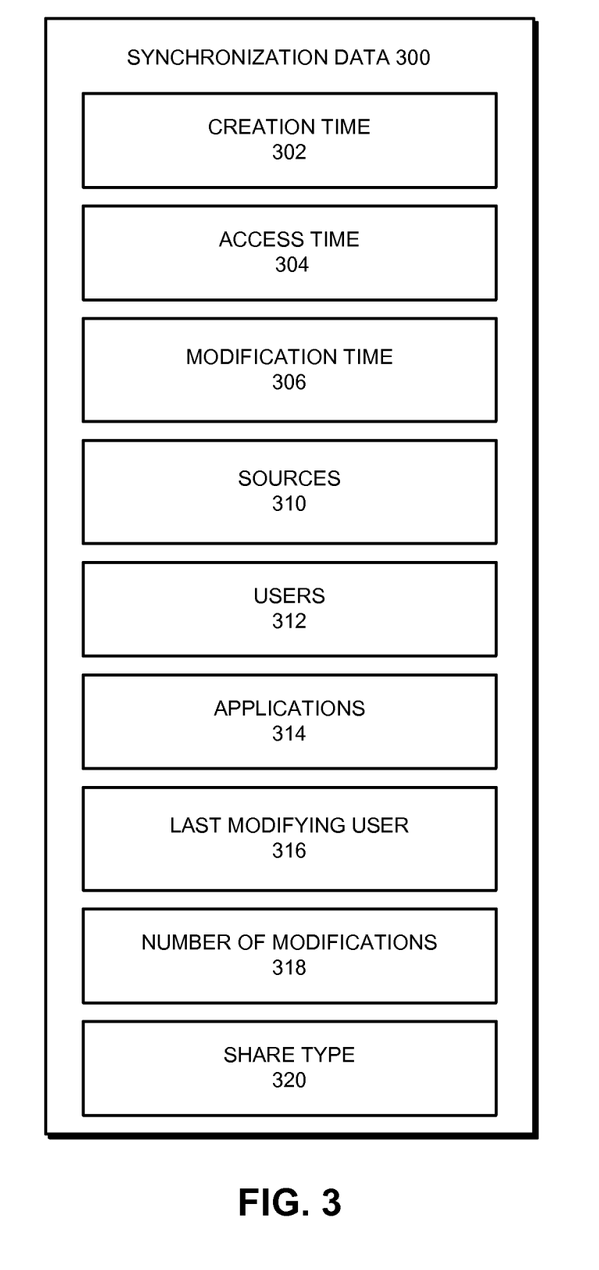
FIG. 3 shows synchronization data for a content item in accordance with the disclosed embodiments.

FIG. 3 shows synchronization data 300 for a content item in accordance with the disclosed embodiments. Synchronization data 300 may be used to determine the relevance of the content item to a user's use of an synchronized content management system containing the content item, such as synchronized content management system 120 of FIG. 1. For example, synchronization data 300 may be used to filter the content item and/or other content items to which the user has access prior to displaying the content item(s) in a file chooser, such as file chooser 206 of FIG. 2.

More specifically, synchronization data 300 may include information related to use of the content item by the user and/or other users. The information may include a creation time 302, an access time 304, and/or a modification time 306. Creation time 302 may represent the time at which the content item was created. For example, creation time 302 may be a timestamp of the creation of a document and/or file on an electronic device of the user. Alternatively, creation time 302 may specify the time at which the document and/or file was initially uploaded to the synchronized content management system from the electronic device.

Access time 304 may represent the time at which the content item was most recently accessed on the synchronized content management system. For example, access time 304 may include a timestamp of the most recent "read" of the content item at the synchronized content management system.

Modification time 306 may specify the time at which the content item was most recently modified on the synchronized content management system. For example, modification time 306 may be a timestamp of the most recent "write" to the content item (e.g., during synchronization of the content item with a version of the content item on an electronic device).

Creation time 302, access time 304, and/or modification time 306 may be used to apply one or more filters to the content item. As described above, the filters may be based on a recentness of use of the content item. For example, the content item may match a recentness filter if the content item was created, accessed, and/or modified in the last day, week, month, and/or within another pre-specified period before the present. The pre-specified period may additionally be adjusted by the user to facilitate identification of the content item by the user through the filter.

Synchronization data 300 may also include a set of sources 310, users 312, and/or applications 314 associated with the content item. Sources 310 may include one or more electronic devices involved in the creation and/or modification of the content item. For example, sources 310 may specify the types of the electronic devices, models of the electronic devices, names of the electronic devices, and/or other identifying information for the electronic devices. As a result, sources 310 may allow the filters to identify content items that are relevant to and/or synchronized with a particular electronic device and/or set of electronic devices. Moreover, access to the content item from multiple sources may indicate that the content item is more relevant than a content item that is accessed from a single source.

Users 312 may identify one or more users who have accessed the content item and/or are capable of accessing the content item. For example, users 312 may include a set of users among which the content item is shared, as well as one or more ordered lists of users who have accessed and/or modified the content item, sorted by access time 304 and/or modification time 306, respectively. In addition, the filters may be applied to the content item so that the content item is displayed within the file chooser if the content item is shared with and/or accessed by a large number of users.

Applications 314 may describe one or more applications with access to the content item. For example, an application may be added to applications 314 if the application is linked to the user's user account with the synchronized content management system, configured to use the file and/or data type of the content item, and/or granted access to the content item by the user. In turn, applications 314 may be used to filter the content item within a file chooser launched by the application so that the content item appears within the file chooser only if the application is specified in synchronization data 300.

Synchronization data 300 may further include information related to modification of the content item. For example, the information may identify a last modifying user 316 of the content item, a number of modifications 318 made to the content item, and/or a share type 320 (e.g., read-write, read-only) of the content item. Such information may be used to display the content item within the file chooser if the content item is frequently modified or is most recently modified by a specific user.

Synchronization data 300 may also include other characteristics related to use of the content item. For example, synchronization data 300 may specify the number of copies of the content item on electronic devices of users with access to the content item at the synchronized content management system, with higher numbers corresponding to higher levels of relevance for the content item. In other words, the list of synchronization data 300 shown in FIG. 3 is not meant to be exhaustive, and a variety of other types of synchronization data 300 may be included as indicators of "relevance" of the content item.

Figure 4:
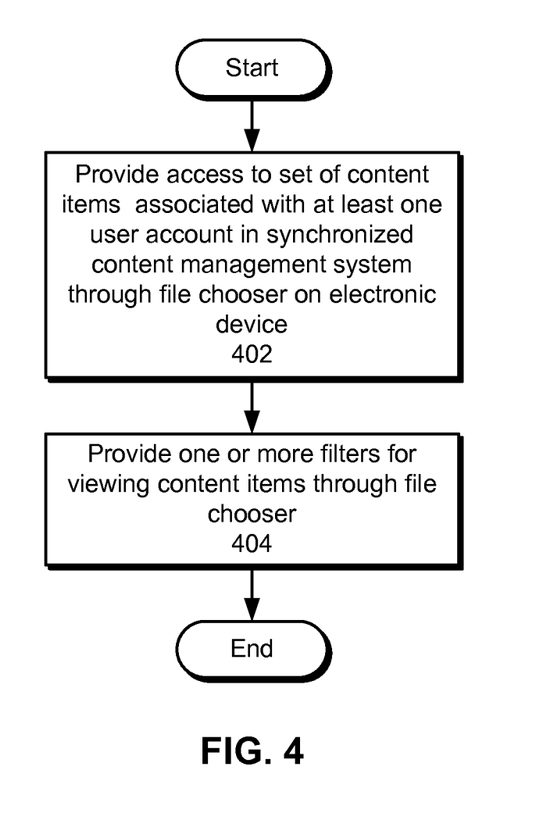
FIG. 4 shows a flowchart illustrating the process of facilitating access to content in accordance with the disclosed embodiments.

FIG. 4 shows a flowchart illustrating the process of facilitating access to content in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

Initially, access to a set of content items at an synchronized content management system is enabled through a file chooser on an electronic device (operation 402). The file chooser may be accessed through an application on the electronic device and/or an API with the application. The content items may include files, directories, content item types, and/or other data items or groupings of data items at the synchronized content management system. The content items may also include one or more content items shared among one or more users of the synchronized content management system.

Next, one or more filters for viewing the content items through the file chooser are provided (operation 404). The filters may be based on synchronization data associated with the content items. For example, the filters may identify content items that were created, modified, accessed, and/or uploaded recently. The filters may also be based on one or more sources of the content items, such as electronic devices used in the creation and/or modification of the content items. The filters may further be based on access to the content items by the application. For example, the filters may identify content items to which an application launching the file chooser has access. The filters may additionally be based on attributes related to sharing of the content items, such as a share status, one or more authorized users, a last modifying user, a number of modifications, a number of sharing users, and/or a share type. Finally, multiple filters may be combined to produce a "weighted" filter of overall relevance of the content items. For example, the filters may include a "most relevant" and/or "suggested content" filter that combines times and/or frequencies of use or modification of the content items with sources of the content items, users associated with the use or modification, and/or applications with access to the content items.

To provide the filters, the file chooser may include a filter presentation mechanism for obtaining a user selection of the one or more filters. Next, application of the filters to the set of content items may be enabled, and one or more filtered content items may be displayed within the file chooser. A organizational structure for the content items may also be displayed below the one or more filtered content items, or a link to the organizational structure may be provided within the file chooser. A user of the electronic device may thus use the file chooser to find, identify, and/or select one or more content items for use with the application.

Figure 5:
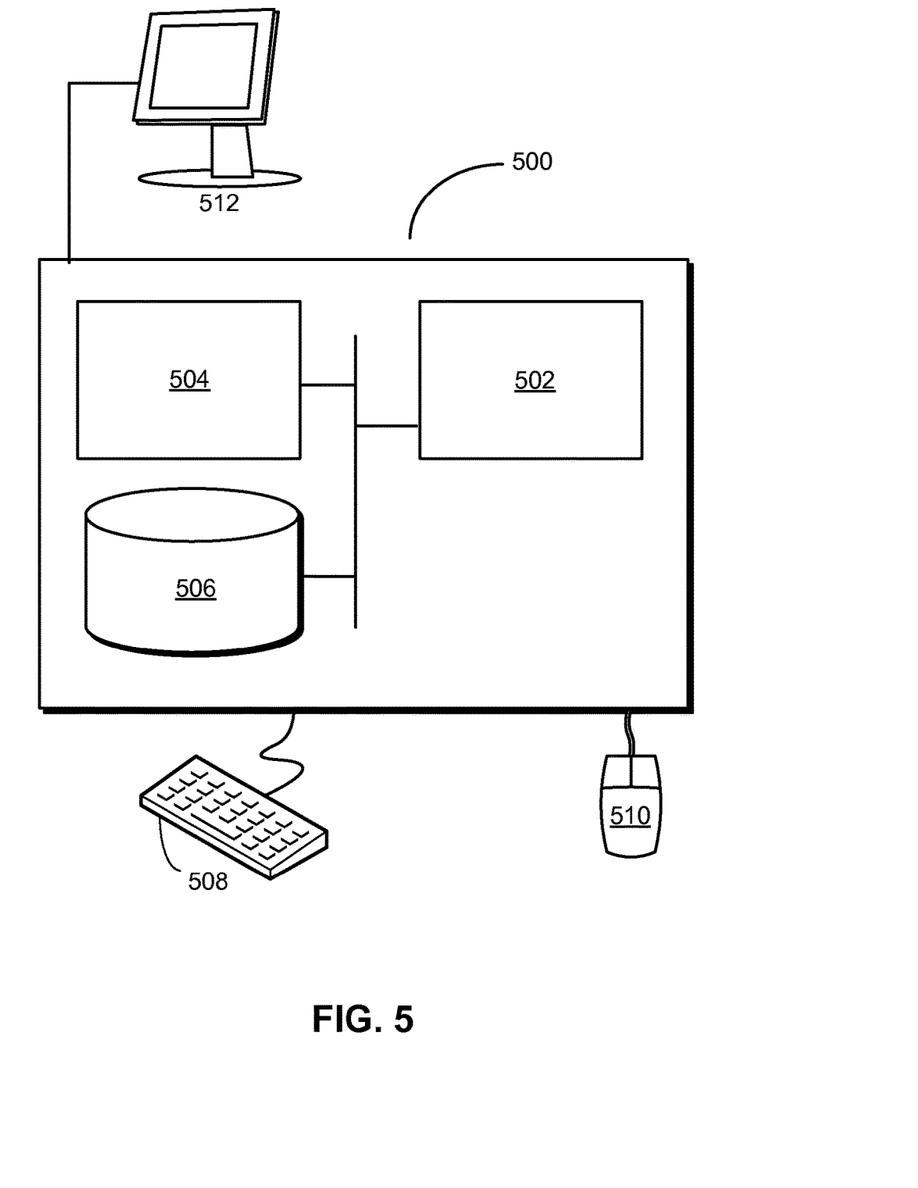
FIG. 5 shows a computer system in accordance with the disclosed embodiments.

FIG. 5 shows a computer system 500 in accordance with the disclosed embodiments. Computer system 500 may correspond to an apparatus that includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for facilitating access to content. The system may include a file chooser that enables access to a set of content items at a synchronized content management system from an electronic device. The system may also include a filtering mechanism that provides one or more filters for viewing the content items through the file chooser. The filter(s) may be based on synchronization data associated with the content items, such as a creation time, an access time, a modification time, a source, a share status, one or more authorized users, one or more applications, a last modifying user, a number of modifications, a number of sharing users, and/or a share type.

In addition, one or more components of computer system 500 may be remotely located and connected to the other components over a network. Portions of the present embodiments (e.g., file chooser, filter presentation mechanism, filtering mechanism, application, electronic devices, etc.) may also be located on different nodes of a distributed system that implements the embodiments. For example, the present embodiments may be implemented using a cloud computing system that provides an API for accessing content items on a synchronized content management system through applications, file choosers, and/or filters on a set of remote electronic devices.

Figure 6:
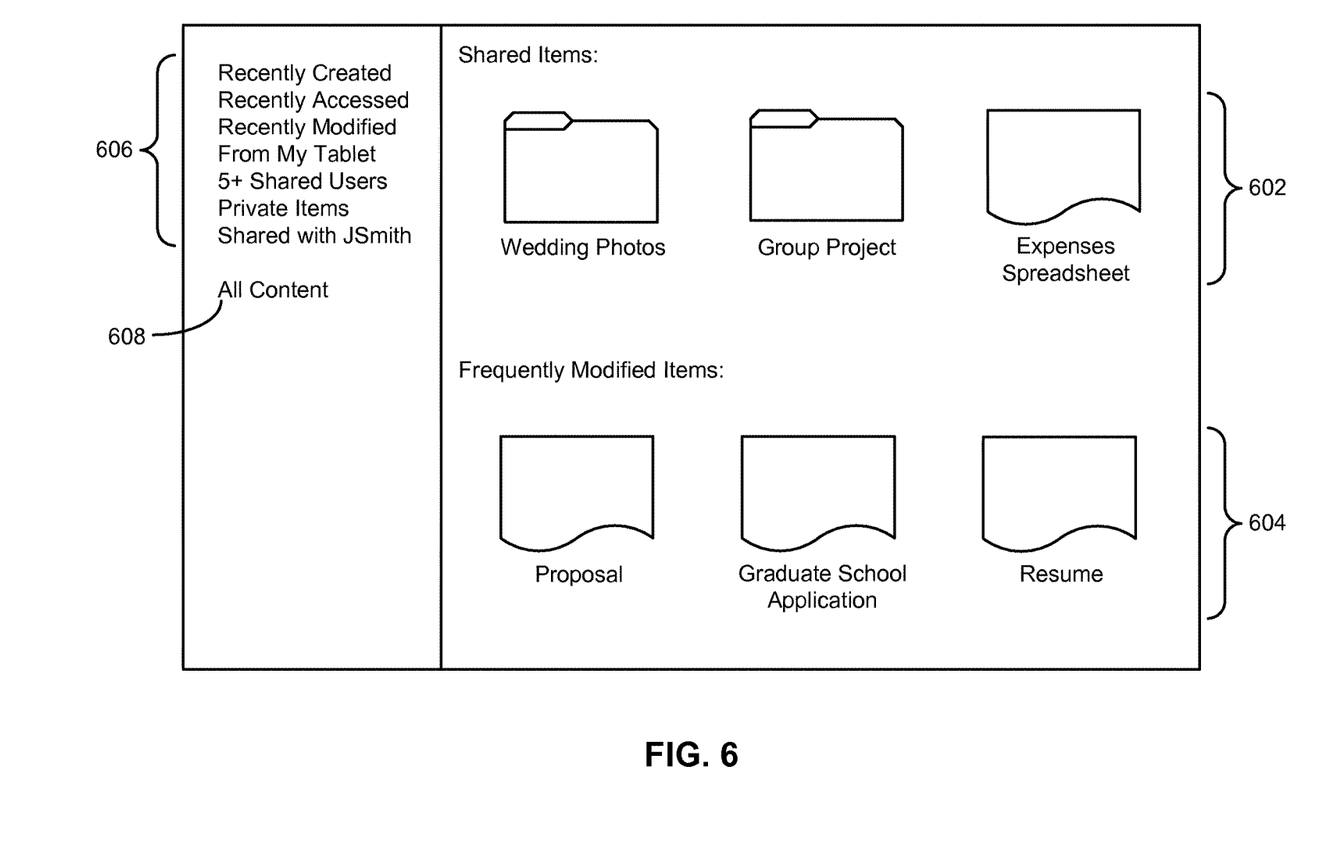
FIG. 6 shows an exemplary screenshot in accordance with the disclosed embodiments.

FIG. 6 shows an exemplary screenshot in accordance with the disclosed embodiments. More specifically, FIG. 6 shows a screenshot of a user interface provided by a file chooser, such as file chooser 206 of FIG. 2. As mentioned above, the file chooser may facilitate identification of "relevant" content items at a synchronized content management system by filtering the contents items based on synchronization data associated with the content items.

As shown in FIG. 6, the user interface includes a first ordered listing 602 generated using a first filter (e.g., "Shared Items") and a second ordered listing 604 generated using a second filter (e.g., "Frequently Modified Items"). For example, ordered listing 602 may include content items that have been shared with other users, such as an album of "Wedding Photos," a directory entitled "Group Project," and an "Expenses Spreadsheet." On the other hand, ordered listing 604 may include content items that are frequently modified, such as content items named "Proposal," "Graduate School Application," and "Resume." In other words, ordered listings 602-604 may include proper subsets of the set of content items to which the user has access.

Ordered listings 602-604 may be presented within the user interface to allow access to the respective content items without requiring searching or navigating an organizational structure associated with storing the content items. For example, the file chooser may be provided by an application that manages projects and documents for a user. In turn, orders listings 602-604 may allow the user to quickly modify, download, synchronize, and/or otherwise access content items that are most relevant to the user's use of the application.

The user interface may also include a filter presentation mechanism that allows the user to select one or more additional filters 606 for application to the content items. For example, filters 606 may include a "Recently Created" filter for accessing recently created content items, a "Recently Accessed" filter for accessing recently accessed content items, and a "Recently Modified" filter for accessing recently modified content items. Filters 606 may also include a "From My Tablet" filter that facilitates access to content items from a specific source (e.g., a tablet computer) and a "5+ Shared Users" filter that identifies content items that have been shared with five or more users. Finally, filters 606 may include a "Private Items" filter for content items that have not been shared with other users and a "Shared with JSmith" filter for content items that have been shared with another user named "JSmith."

The behavior of the file chooser may additionally be configured based on the user's preferences. For example, the user may configure the file chooser to display ordered listings 602-604 whenever the user opens the file chooser. The user may also add, remove, or modify filters 606 the user may select from within the file chooser. For example, the user may configure filters 606 to include a filter for content items that are shared with other users on a read-only basis and that have been accessed by the other users in the last week.

Below filters 606, the user interface may include an "All Content" mechanism 608 for presenting all content items in the synchronized content management system to which the user has access. By selecting mechanism 608, the user may access an organizational structure for the content items provided by the synchronized content management system. For example, the user may select mechanism 608 to view a directory structure within which the content items are stored, an alphabetical listing of the contents items, and/or groupings of the content items by content item type (e.g., documents, images, video, web pages, etc.).

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method comprising:
providing access to a remote set of content items and a local set of content items, each associated with a content management system through a file explorer interface on an electronic device, the remote set of content items and the local set of content items being associated with a user account at the content management system, the file explorer interface providing remote access to the remote set of content items stored on the content management system integrated with local access to the local set of content items stored on the electronic device and synchronized with the content management system, wherein a portion of the remote set of content items is distinct from a portion of the local set of content items;
receiving, from the content management system by a content management client application associated with the content management system, synchronization data identifying the remote set of content items stored on the content management system and the local set of content items stored on the electronic device, the synchronization data comprising at least one of a content share attribute or a shared content usage attribute, whereby a portion of the synchronization data is associated with a second user account at the content management system;

providing a filter for filtering the remote set of content items and the local set of content items to identify, based on the synchronization data, a filtered subset of content items of the remote set of content items and the local set of content items, each content item in the filtered subset of content items having a common characteristic in the synchronization data defined by the filter; and in response to an application of the filter, displaying the filtered subset of content items on the file explorer interface; and sending, to the content management system from the file explorer interface, an indication identifying selection of one or more of the remote set of content items from the filtered subset of content items.

2. The computer-implemented method of claim 1, wherein the shared content usage attribute comprises at least one of a creation time, an access time, a modification time, or a number of modifications.

3. The computer-implemented method of claim 1, further comprising:
generating a first ordered listing of the filtered subset of content items;
generating a second ordered listing of a second filtered subset of content items matching a second filter; and
presenting the first ordered listing and the second ordered listing in the file explorer interface.

4. The computer-implemented method of claim 1, wherein the content share attribute comprises at least one of a share status or a number of user accounts having shared access.

5. The computer-implemented method of claim 1, wherein providing remote access to the remote set of content items comprises providing at least one of:
navigation access to the remote set of content items;
modification access to the remote set of content items;
creation of remote content items; and
upload access for uploading remote content items to the content management system.

6. The computer-implemented method of claim 1, wherein displaying the filtered subset of content items on the file explorer interface comprises displaying the filtered subset of content items according to a display arrangement that is different from a storage organizational structure associated with the remote set of content items stored on the content management system.

7. The computer-implemented method of claim 1, wherein the file explorer interface allows content items displayed within the file explorer interface to be selected, retrieved from storage at the content management system, and loaded on a client-side application at the electronic device.

8. The computer-implemented method of claim 1, further comprising:
applying the filter to content items associated with the synchronization data;
displaying the filtered subset of content items within the file explorer interface;
displaying an indication of a storage organizational structure of content items separately from the filtered subset of a content items; and
displaying a link to the storage organizational structure of content items at the file explorer interface.

9. A system comprising:
one or more processors; and
at least one computer-readable storage medium having stored therein instructions which, when executed by the one or more processors, cause the system to:
provide, via a file chooser having communications with a remote content management system, access to content items associated with the remote content management system, the content items being associated with one or more user accounts in the remote content management system, the file chooser providing remote access to remote content items stored at the remote content management system integrated with local access to local content items on an electronic device synchronized with the remote content management system, wherein a portion of the remote content items is distinct from a portion of the local content items;
provide, via the file chooser, one or more filters based on synchronization data received from the remote content management system and associated with content items of the remote content management system;
provide access to the file chooser from a third party application;
provide from the file chooser to the third party application, the one or more filters for displaying, through the third party application, a filtered subset of content items of the remote content items integrated with the local content items, each content item in the filtered subset of content items having a common characteristic defined by the one or more filters, the common characteristic comprising at least one of a content share attribute or a shared content usage attribute, whereby a portion of the synchronization data is associated with a second user account at the remote content management system; and
in response to a selection of the one or more filters, display, within the third party application, the filtered subset of the remote content items integrated with the local content items.

10. The system of claim 9, wherein the shared content usage attribute comprises at least one of a creation time, an access time, a modification time, or a number of modifications.

11. The system of claim 9, wherein providing the one or more filters via the file chooser comprises:
generating a first ordered listing using a first filter;
generating a second ordered listing using a second filter; and
providing the first ordered listing and the second ordered listing to the third party application from the file chooser.

12. The system of claim 9, wherein the shared content usage attribute is based on at least one of:
an access event associated with a respective content item;
a modification event associated with the respective content item;
a creation event associated with the respective content item; and
uploading of the respective content item to the remote content management system.

13. The system of claim 9, wherein the content share attribute comprises at least one of a share status, a share type, or a number of user accounts having shared access.

14. The system of claim 9, wherein providing the one or more filters comprises at least one of:
applying the one or more filters to the remote content items integrated with the local content items;

displaying a storage organizational structure associated with the content items at the remote content management system, the storage organization structure being displayed within the third party application but separate from the filtered subset of content items; and displaying a link to the storage organizational structure within the third party application.

15. A computer-readable storage medium comprising:

instructions stored thereon which, when executed by a computer device, cause the computer device to:

present, on a file explorer application, remote content items stored on a content management system, the remote content items being associated with one or more user accounts in the content management system, the file explorer application providing remote navigation access to the remote content items on the content management system integrated with local navigation access to one or more local content items on the computer device synchronized with the content management system;

provide a client application associated with the content management system, wherein the client application receives filter data from the content management system associated with content items of the content management system;

provide, based on filter data, one or more filters for filtering one or more of the content items presented on the file explorer application based on at least one of a content share attribute or a shared content usage attribute, whereby a portion of synchronization data is associated with a second user account at the content management system;

in response to an application of the one or more filters, select a first subset of the remote content items and the local content items for presentation at the file explorer application and a remaining subset of the remote content items and the local content items for excluding from presentation at the file explorer application, the first subset of the remote content items and the local content items having at least one of the content share attribute or the shared content usage attribute; and present, on the file explorer application, the first subset of the remote content items and the local content items and exclude the remaining subset of the remote content items and the local content items.

16. The computer-readable storage medium of claim 15, wherein the shared content usage attribute comprises at least one of a creation time, an access time, a modification time, or a number of modifications.

17. The computer-readable storage medium of claim 15, storing additional instructions which, when executed by the computer device, cause the computer device to:

apply the one or more filters to the remote content items and the local content items; and in response to applying the one or more filters:

generating, based on a first filter from the one or more filters, a first ordered listing comprising the first subset of the content items;

generating, based on a second filter from the one or more filters, a second ordered listing comprising a second subset of the content items; and presenting the first ordered listing and the second ordered listing in the file explorer application.

18. The computer-readable storage medium of claim 15, wherein the file explorer application provides access to perform at least one of:

modification of the content items;

creation of the content items; and uploading of the content items to the content management system.

19. The computer-readable storage medium of claim 15, wherein the first subset of the remote content items and the local content items is presented on the file explorer application according to an arrangement that is different than a storage organization hierarchy of the content items on the content management system.

20. The computer-readable storage medium of claim 15, wherein the file explorer application provides access to navigate the content items on the content management system according to a storage organizational structure associated with the content management system, and wherein the file explorer application provides access to navigate one or more local content items on the computer device according to a filesystem organizational structure associated with the computing device.

* * * * *